United States Patent
Wu

(10) Patent No.: US 9,684,428 B2
(45) Date of Patent: Jun. 20, 2017

(54) METHOD OF STARTING APPLICATIONS INSTALLED ON A MOBILE OPERATING SYSTEM IN A MULTI-WINDOW MODE AND DEVICE USING THE SAME

(71) Applicant: INSYDE SOFTWARE CORP., Taipei (TW)

(72) Inventor: Tsung-En Wu, Taipei (TW)

(73) Assignee: INSYDE SOFTWARE CORP., Taipei (TW)

( * ) Notice: Subject to any disclaimer, the term of this patent is extended or adjusted under 35 U.S.C. 154(b) by 196 days.

(21) Appl. No.: 14/061,044

(22) Filed: Oct. 23, 2013

(65) Prior Publication Data

US 2014/0365933 A1 Dec. 11, 2014

(30) Foreign Application Priority Data

Jun. 7, 2013 (TW) .............................. 102120229 A

(51) Int. Cl.
| | |
|---|---|
| G06F 3/048 | (2013.01) |
| G06F 3/0481 | (2013.01) |
| G06F 3/0486 | (2013.01) |
| G06F 9/44 | (2006.01) |
| G06F 9/445 | (2006.01) |

(52) U.S. Cl.
CPC ........ *G06F 3/04817* (2013.01); *G06F 3/0486* (2013.01); *G06F 9/445* (2013.01); *G06F 9/4443* (2013.01)

(58) Field of Classification Search
CPC ................................................ G06F 17/30882
USPC ....................................................... 715/798
See application file for complete search history.

(56) References Cited

U.S. PATENT DOCUMENTS

| | | | | |
|---|---|---|---|---|
| 5,734,380 A | * | 3/1998 | Adams ................. | G06F 3/0481 715/792 |
| 2007/0226647 A1 | * | 9/2007 | Louch .......................... | 715/788 |
| 2010/0088634 A1 | * | 4/2010 | Tsuruta ................. | G06F 3/0488 715/800 |
| 2013/0120447 A1 | * | 5/2013 | Kim ....................... | G06T 11/60 345/629 |
| 2013/0290887 A1 | * | 10/2013 | Sun ....................... | G06F 3/0482 715/769 |

(Continued)

OTHER PUBLICATIONS

FunctionX Inc., Microsoft Windows Tutorial-Lesson 6: Anatomy of a Window, Feb. 10, 2008, pp. 5-7.*
Microsoft Windows, ShowWindow Function, Sep. 25, 2011, pp. 1-2.*

*Primary Examiner* — Anil N Kumar
(74) *Attorney, Agent, or Firm* — Muncy, Geissler, Olds & Lowe, P.C.

(57) ABSTRACT

A method and a device of starting applications installed on a mobile operating system (OS) is performed by a mobile device for the mobile OS to flag any application installed on the mobile OS as a windowed application and display the application under a multi-window mode when the application is started. When multiple applications are simultaneously started, the mobile OS sequentially determines if each application is a windowed application. If positive, the application is displayed under the multi-window mode, and the size and location of the displayed window frame with the application running thereon are adjustable, rendering higher operational efficiency and convenience of software applications installed on a mobile OS.

19 Claims, 19 Drawing Sheets

(56) References Cited

U.S. PATENT DOCUMENTS

2013/0300684 A1* 11/2013 Kim ...................... G06F 3/0488
                                                                345/173
2013/0305184 A1* 11/2013 Kim ...................... G06F 3/0481
                                                                715/781
2014/0164966 A1*  6/2014 Kim et al. .................... 715/769

* cited by examiner

METHOD OF STARTING APPLICATIONS INSTALLED ON A MOBILE OPERATING SYSTEM IN A MULTI-WINDOW MODE AND DEVICE USING THE SAME

The current application claims a foreign priority to the patent application of Taiwan No. 102120229 filed on Jun. 7, 2013.

BACKGROUND OF THE INVENTION

1. Field of the Invention

The present invention relates to a device of starting software applications installed on a mobile operating system (OS), and, more particularly, to a method of starting software applications installed on the Android OS in a multi-window mode and to a device using the starting method.

2. Description of the Related Art

Commonly used mobile OSs in the current market can be classified into either multi-tasking type or single-tasking type. A single-tasking OS in a single-tasking platform, such as iPhone®, allows users to run one software application (App) at a time, while a multi-tasking OS in a multi-tasking platform, such as the Android OS, allows users to run multiple applications simultaneously and in a background mode.

As the Android OS is an open-source software stack and has a kernel developed based on Linux and provides basic functions of OS, it is the job of app developers to develop desired apps running on the Android OS using the Java programming language. System manufacturers and app developers can adaptively build mobile devices equipped with the Android OS dedicated to different market demands.

With reference to FIG. 18, a conventional Android OS has a default system screen 90. The system screen 90 has a status bar 91 on a bottom of the system screen 90. The status bar 91 has a notification area 92 and multiple command icons 93. The notification area 92 is located on one end of the status bar 91 and serves to display current time and remaining power of a mobile device equipped with the Android OS. The command icons 93 are arranged on the other end of the status bar 91 to provide the default functions of returning to a previous screen and to the home screen, and listing recently started apps. After being selected, each started app on the system screen 90 is displayed in a full-screen mode. Other applications are unable to be started because the entire screen is occupied by the started app. Before returning to the system screen 90 to start other applications, users must terminate the application running under the full-screen mode.

For certain mobile device equipped with the Android OS, with reference to FIG. 19, the system screen 90 is shown and the status bar 91 further has a starting key 94 and an app menu 95. The starting key 94 takes the form of an up arrow initially, and is located on a center of the status bar 91. Once clicked, the starting key 94 is changed to the form of a down arrow key, the command icons 93 are hidden, and the app menu 95 is popped up on the system screen 90 and is displayed above the system bar 91. The app menu 95 lists all default applications of the system for users to conveniently and promptly select and start those applications. After being started, the applications in the app menu 95 are displayed in a multi-window mode.

However, except the default applications in the app menu 95, other third-party applications are unable to be incorporated into the app menu 95. In other words, except the default applications in the app menu 95, other applications should be executed under a full-screen mode and are unable to be executed under a multi-window mode. Hence, inconvenience and inefficiency arises when users want to run any application other than the default applications and simultaneously run multiple applications under the multi-window mode.

SUMMARY OF THE INVENTION

An objective of the present invention is to provide a method and a device of starting applications installed on a mobile operating system (OS) under a multi-window mode flagging any application installed on a mobile device as a windowed application, and displaying the application under the multi-window mode with flexibilities in adjusting the size and location of any window frame with a windowed application running thereon.

To achieve the foregoing objective, the method of starting applications installed on a mobile OS under a multi-window mode is performed by the mobile OS and has steps of:

providing a system screen;

displaying at least one application for users to select;

receiving an execution command of one of the at least one application selected by users;

determining if the selected application is flagged as a windowed application; and running the selected application under a multi-window mode if the selected application is flagged as a windowed application, or running the selected application under another mode if the selected application is not flagged as a windowed application.

The foregoing method allows users to select any application displayed on the system screen, determines if the selected application has been flagged as an windowed application, and displays the selected application in the multi-window mode, thereby demonstrating all the applications installed on the mobile OS under the multi-window mode. As a result of the execution of multiple applications under the multi-window mode, the size and location of the displayed window frames with selected windowed applications running thereon are adjustable so that multiple window frames with corresponding applications running thereon can be displayed on the screen of a multi-tasking system in a non-conflicting manner and the operation efficiency of software application can be further enhanced.

To achieve the foregoing objective, a mobile device of starting applications installed on a mobile operating system (OS) under a multi-window mode has a storage device, a touch panel, and a processor.

The storage device serves to store multiple applications.

The touch panel has a touch pad and a display.

The touch pad serves to receive a signal for launching a selected one of the applications.

The display serves to display a system screen.

The processor is electrically connected to the touch pad, the display, and the storage device, is managed by a mobile OS, receives the signal from the touch panel for launching the selected application, flags the selected application as a windowed application, and displays the selected application under a multi-window mode when receiving the signal for launching the selected application. A size and a location of each displayed windowed application are adjustable.

Given the mobile device, applications can be displayed in the multi-window mode. When users intend to start multiple applications in a multi-window mode, the size and the location of each window frame with a corresponding selected application running thereon are adjustable for the mobile device to provide the window-on-top display functionality, thereby exploring the optimal operational efficiency and convenience in a multi-tasking system.

Other objectives, advantages and novel features of the invention will become more apparent from the following detailed description when taken in conjunction with the accompanying drawings.

DETAILED DESCRIPTION OF THE INVENTION

A method of starting applications installed on a mobile operating system (OS) in a multi-window mode in accordance with the present invention can be performed by a mobile operating system (OS) to execute applications installed on a mobile device under a multi-window mode. The mobile OS may be an Android OS or any other mobile OS with similar structure that provides basic functions of OS while leaving development of applications running on the mobile OS to application developers.

Figure 1:
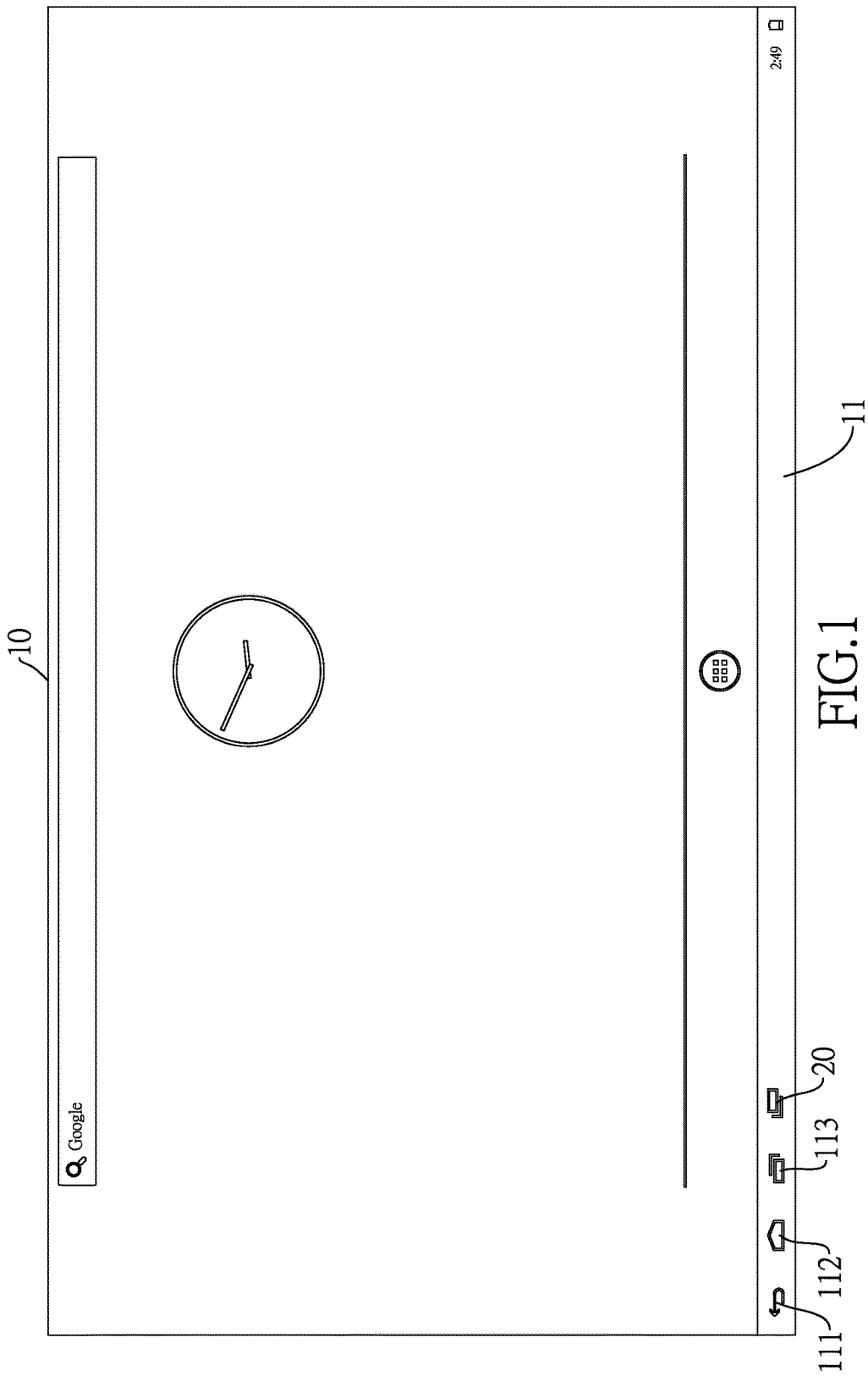
FIG. 1 is a schematic view of an initial system screen of a mobile OS in accordance with the present invention.
Figure 2:
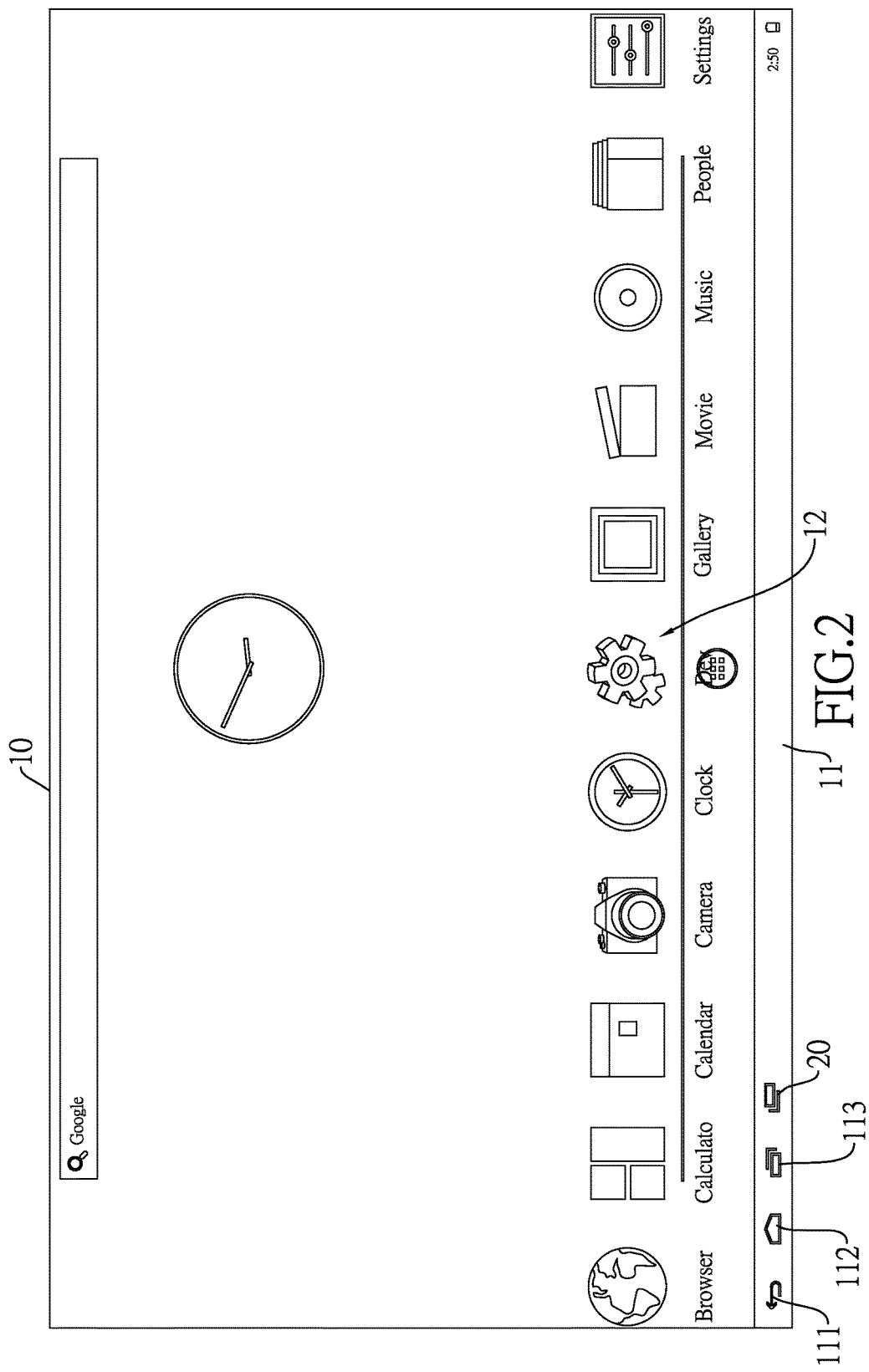
FIG. 2 is a schematic view of the system screen in FIG. 1 with an app menu displayed thereon.

With reference to FIGS. 1 and 2, the mobile OS provides a system screen 10 having a status bar 11 on a bottom of the system screen 10. The status bar 11 has multiple command icons and a starting button 20. The command icons are arranged on one end of the status bar 13, and have a back button 111, a home button 112, and a recent app listing button 113 as provided by the Android OS as the default command icons. The back button 111 is clicked for the Android OS to return to a previous screen. The home button 112 is clicked for the Android OS to go back to the initial system screen 10. The recent app listing button 113 is clicked to list all applications, which have been executed recently, for users to select and execute desired applications.

The starting button 20 is located beside the command icons and serves to launch a windowed application menu 12 and display the windowed application menu 12 above the status bar 11 for users to click and execute desired applications sequentially displayed on the system screen 10 after the starting button 20 is clicked by users. Meanwhile, the back button 111, the home button 112, and the recent app listing button 113 are still available on the status bar 11 for users to return to the previous screen or the home screen or to start the last application, rendering operational flexibility and convenience to users.

In the method, the mobile OS determines if an application installed thereon is a windowed application based on a configurable windowed flag of the application. The means of configuring the windowed flag is to flag an application installed on the mobile OS as a windowed application when being added to the windowed application menu 12. What worth mentioning is that only those applications added to the windowed application menu 12 can be flagged as windowed applications upon being started while the same applications are not flagged as windowed applications and are displayed under a full-screen mode if being started by a default launcher. Another means of configuring the windowed flag is to directly flag an application as a windowed application while programming the application.

Figure 3:
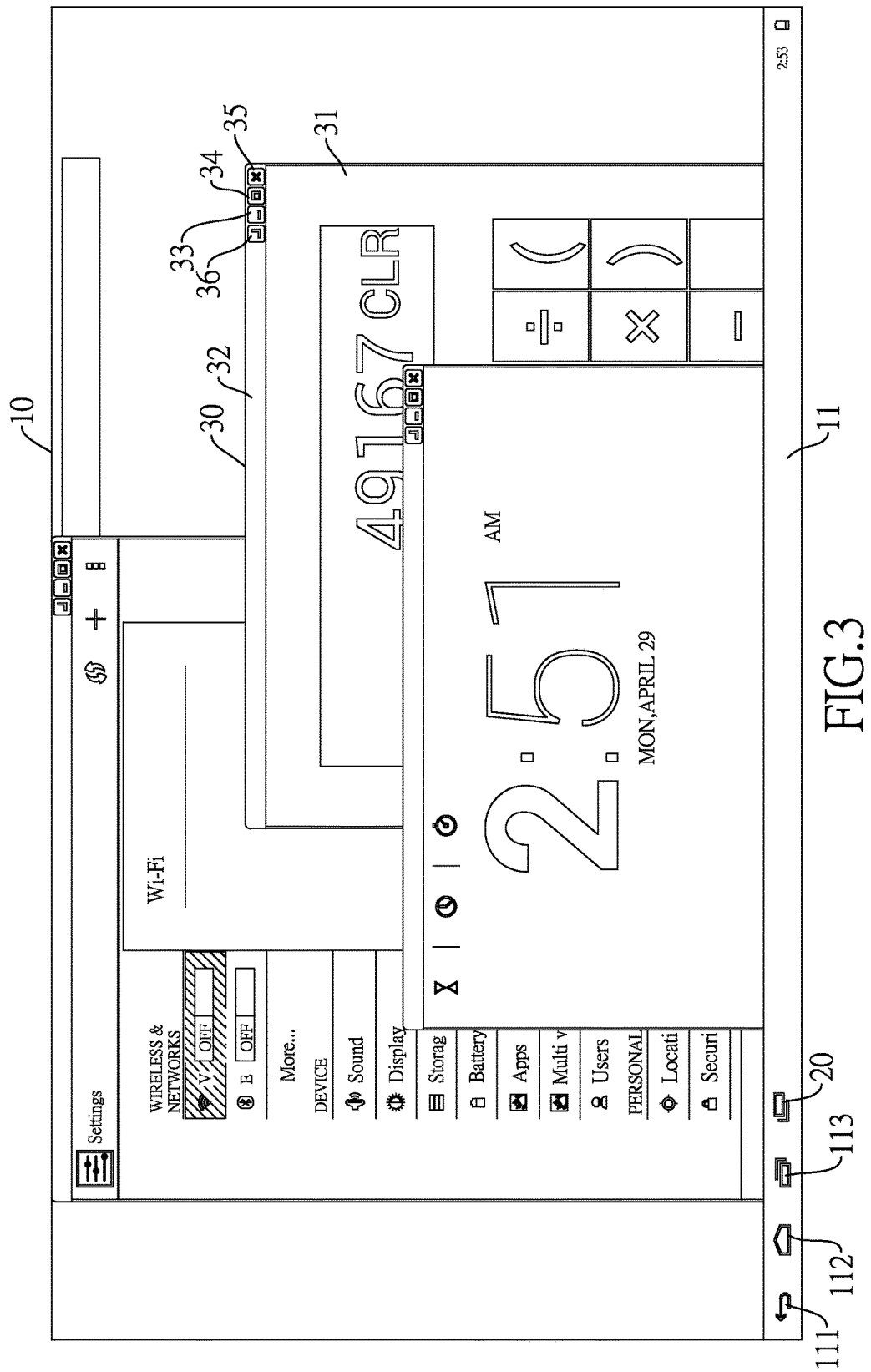
FIG. 3 is a schematic view of the system screen in FIG. 1 with multiple applications simultaneously running on the mobile OS.
Figure 4:
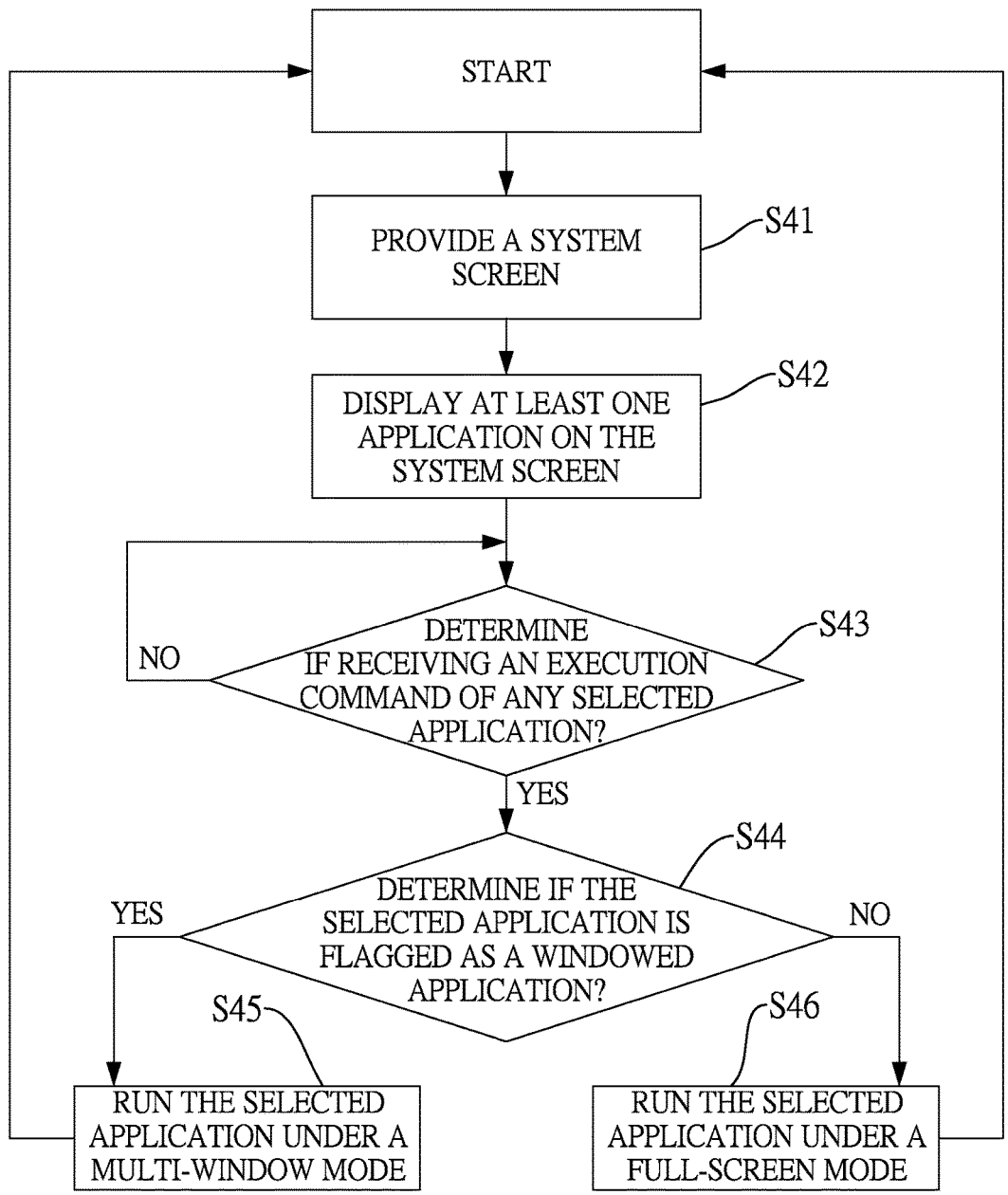
FIG. 4 is a flow diagram of a multi-window mode performed on the mobile OS in accordance with the present invention.

With reference to FIG. 2, the windowed application menu 12 includes multiple applications already installed on the mobile OS and orderly arranged in the windowed application menu 12 for each application in the windowed application menu 12 to be clicked and executed under a multi-window mode. With reference to FIG. 3, as multiple applications are executable under the multi-window mode, a multi-tasking OS facilitates the simultaneous execution of multiple applications.

For each windowed application running under the foregoing multi-window mode, the location of the window with the windowed application executed thereon is movable, and the size and the sequence of the window is also user-adjustable. The mobile OS first draws a border 30 and a panel 31 of a window frame for the windowed application to run thereon. The window frame further has a title bar 32 with multiple system command icons thereon, including a minimize button 33, a maximize button 34, a close button 35, and a roll-up button 36, for users to conveniently view, close, or switch the sequence priorities of the windowed applications displayed on the system screen 10.

From the foregoing implementation, the method of starting applications installed on a mobile OS under a multi-window mode is performed by the foregoing mobile OS and has the following steps.

Step S41: Provide a system screen 10.

Step S42: Display at least one application for users to select. The at least one application is displayed on the system screen 10 or on the windowed application menu 12 for users to click.

Step S43: Determine if receiving an execution command of the application selected and inputted by users.

Step S44: Determine if the selected application is flagged as a windowed application.

Step S45: Run the selected application under a multi-window mode if the selected application is flagged as a windowed application.

Step S46: Run the selected application under a full-screen mode when the selected application is not flagged as a windowed application.

Figure 5:
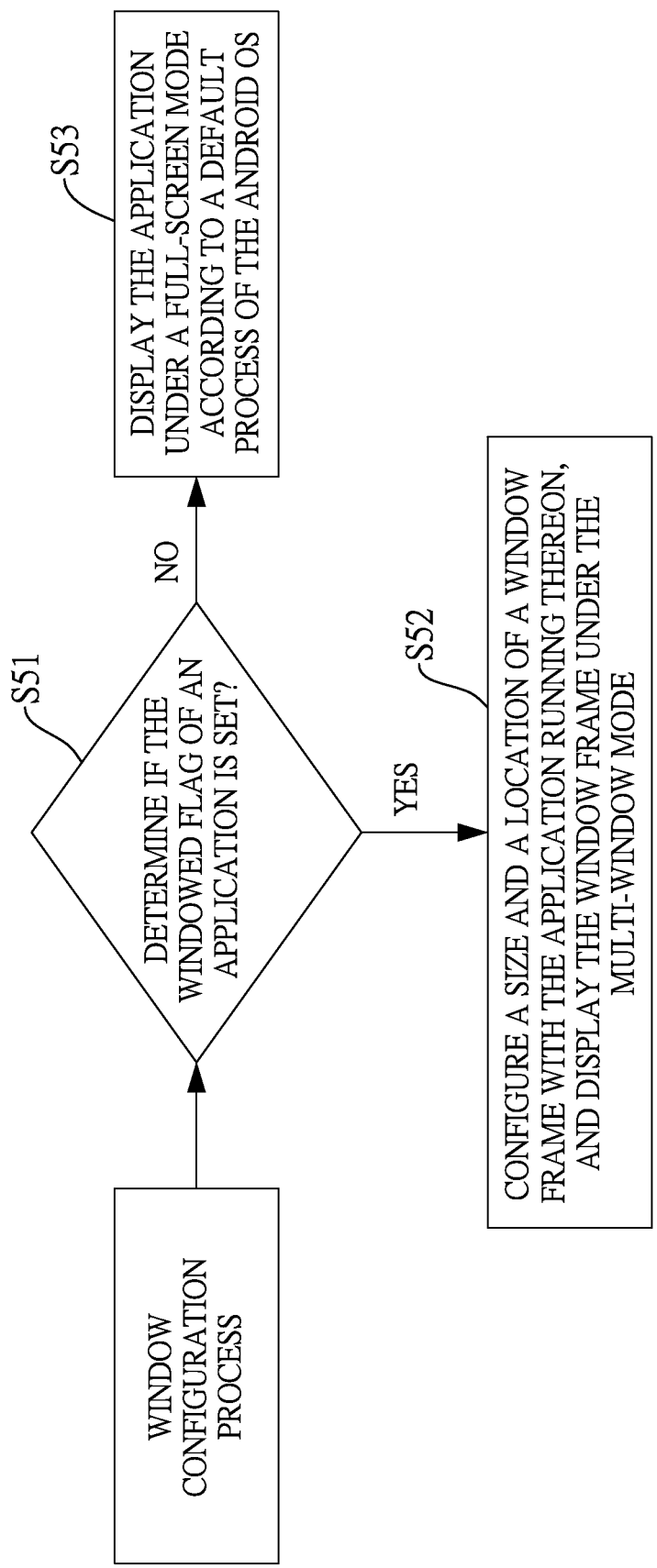
FIG. 5 is a flow diagram of a window configuration process performed on the mobile OS in accordance with the present invention.

In the foregoing steps, when the mobile OS receives the execution command of the application selected by users, it indicates that users intend to run the application under the multi-window mode, and, with reference to FIG. 5, a window configuration process is a detailed implementation of steps S45 and S46. The window configuration process has the following steps.

Step S51: Determine if the windowed flag of an application is set, and when the determination result is positive, perform Step S52, otherwise, perform Step S53.

Step S52: Configure a size and a location of a window frame with the application running thereon, and display the window frame under the multi-window mode.

Step S53: Display the application under a full-screen mode according to a default process of the Android OS.

Figure 6:
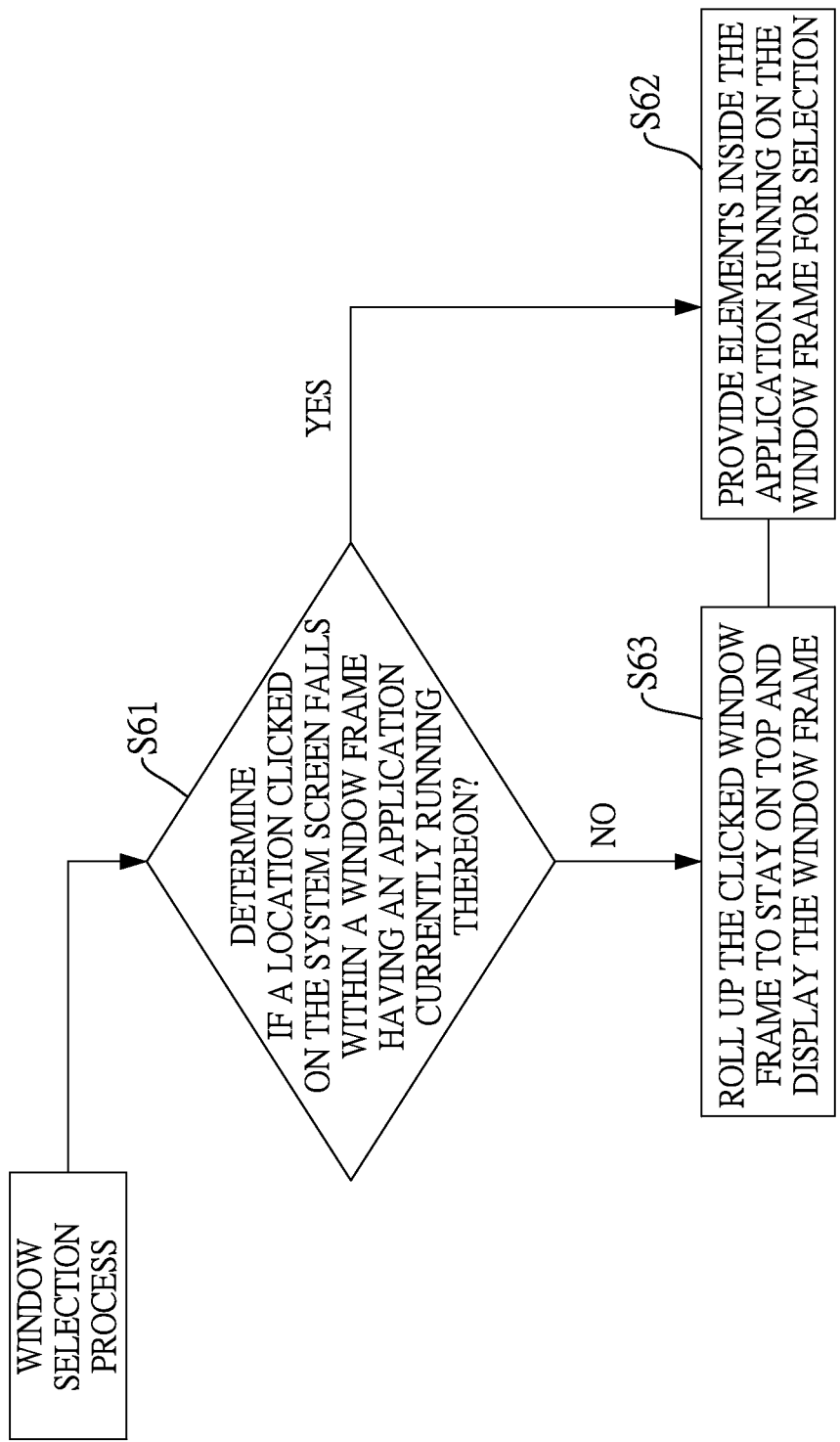
FIG. 6 is a flow diagram of a window selection process performed on the mobile OS in accordance with the present invention.
Figure 7:
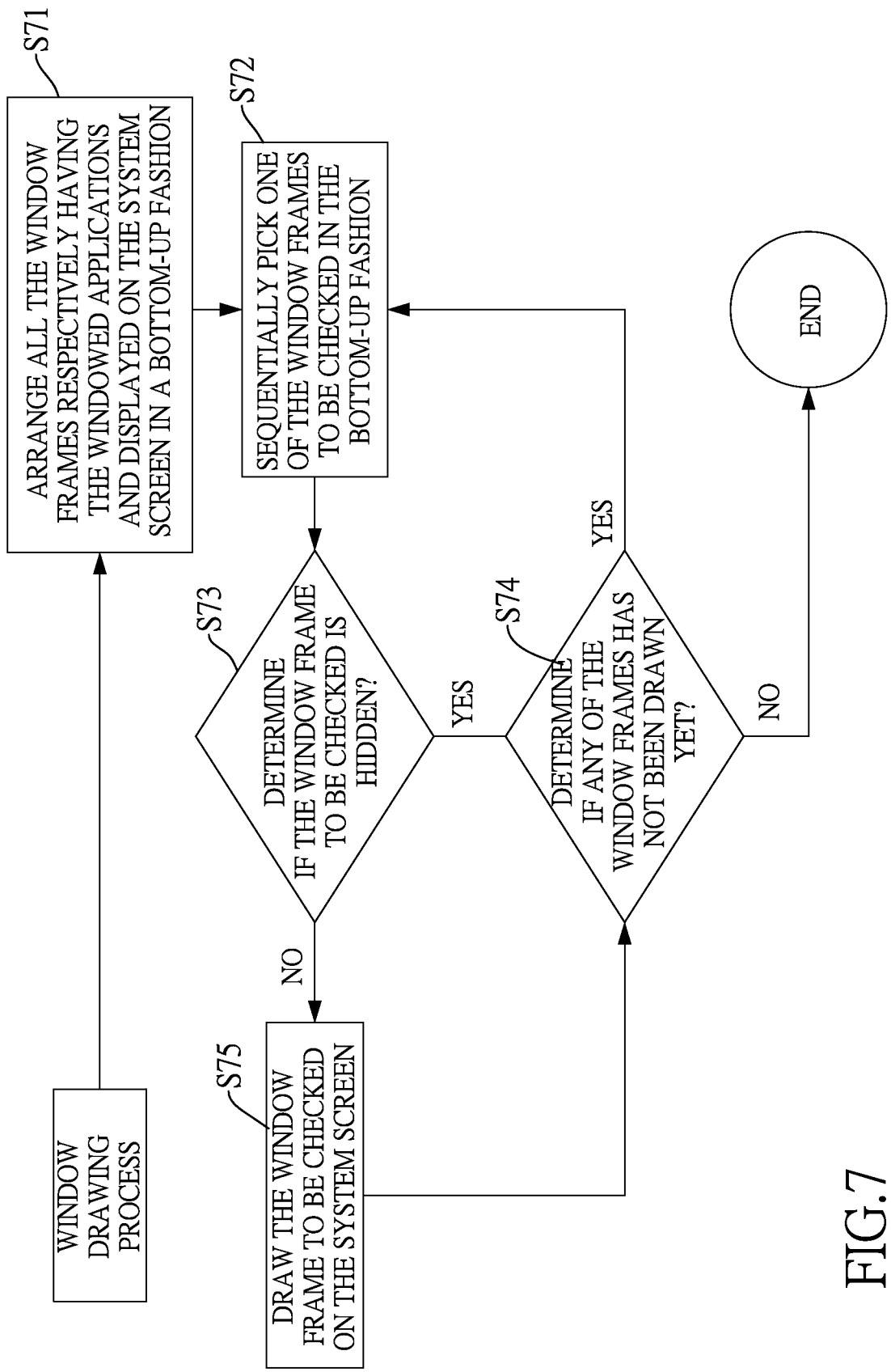
FIG. 7 is a flow diagram of a window drawing process performed on the mobile OS in accordance with the present invention.

As the mobile OS is a multi-tasking OS, multiple applications can be executed under the multi-window mode. However, when multiple applications simultaneously run on the system screen 10, the window frames respectively having the applications executed thereon may overlap each other. When there are multiple windows frames displayed on the system screen 10 and respectively having corresponding applications running thereon, with reference to FIG. 6, step S52 further has a window selection process coping with the an overlapping condition. The window selection process has the following steps.

Step S61: Determine if a location clicked on the system screen 10 falls within a window frame having an application currently running thereon. When the determination result if positive, perform step S62, otherwise, perform step S63.

Step S62: Provide elements inside the application running on the window frame for selection.

Step S63: Roll up the clicked window frame to stay on top and display the window frame.

After the selected applications are started under the multi-window mode and the window configuration process and the window selection process are performed, step S52 further has a window drawing process to draw multiple windowed applications on the system screen 10. The window drawing process has the following steps.

Step S71: Arrange all the window frames respectively having the windowed applications and displayed on the system screen 10 in a bottom-up fashion.

Step S72: Sequentially pick one of the window frames to be checked in the bottom-up fashion.

Step S73: Determine if the window frame to be checked is hidden and not displayed on the system screen 10. When the window frame to be checked is hidden, perform step S74, otherwise, perform step S75.

Step S74: Determine if any of the window frames has not been drawn yet.

Step S75: Draw the window frame to be checked on the system screen 10, and determine if any of the window frames has not been drawn yet. When there is any window frame that has not been drawn yet, return to step S72, otherwise, terminate the window drawing process.

Figure 8:
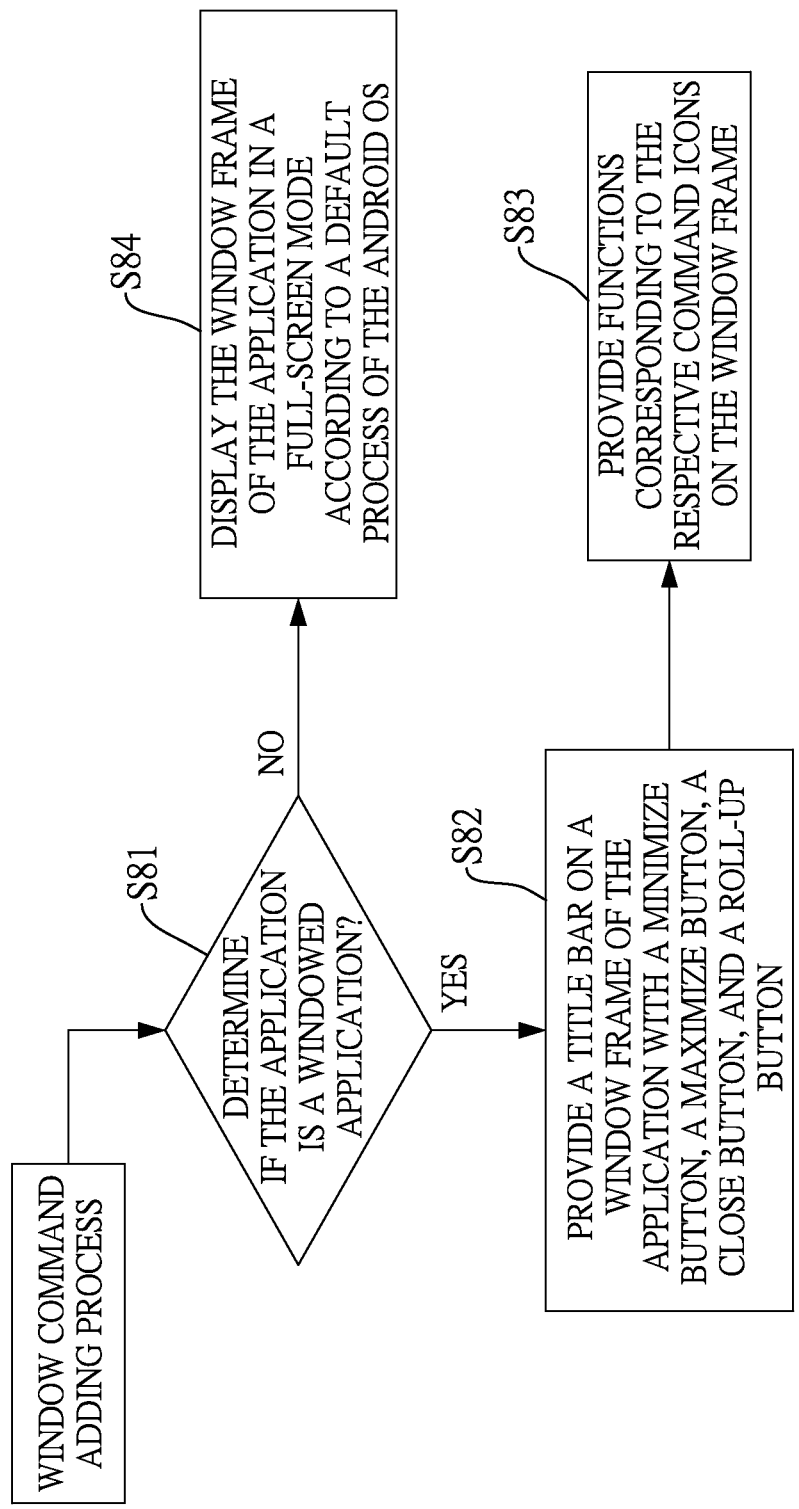
FIG. 8 is a flow diagram of a window command adding process performed on the mobile OS in accordance with the present invention.
Figure 9:
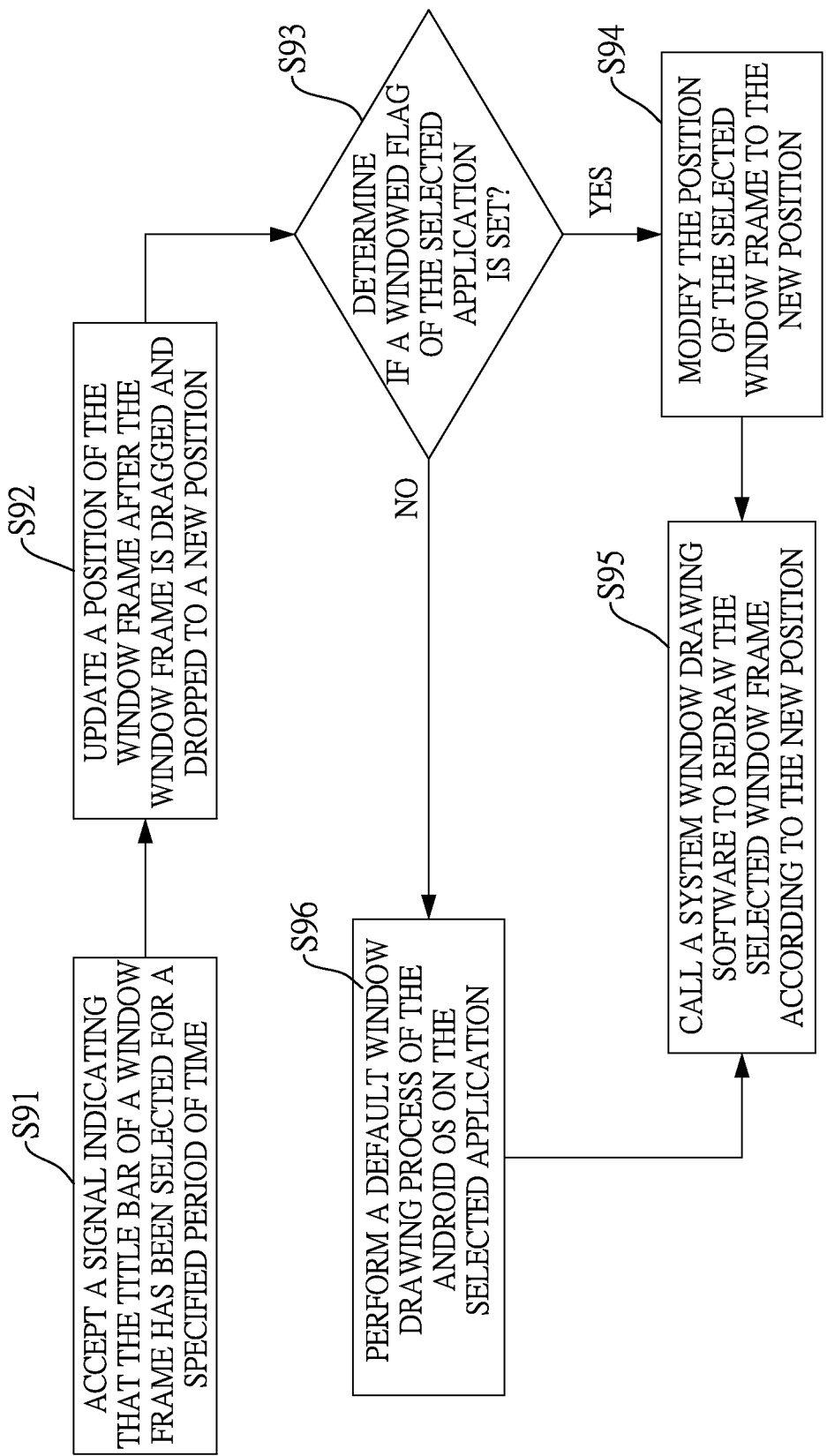
FIG. 9 is a flow diagram of a window moving process performed on the mobile OS in accordance with the present invention.

After any windowed application is executed and a corresponding window frame is generated, a window command adding process is performed to add window commands on the title bar 32 of the window frame. With reference to FIGS. 3 and 8, the window command adding process has the following steps.

Step S81: When executing an application, determine if the application is a windowed application. The way of determining if the application is a windowed application depends on if a windowed flag of the application is set. When the application is a windowed application, perform step S82 and step S83.

Step S82: Provide a title bar 32 on a window frame of the application with multiple command icons on one end of the title bar 32. The command icons include a minimize button 33, a maximize button 34, a close button 35, and a roll-up button 36.

Step S83: Provide functions corresponding to the respective command icons on the window frame.

Step S84: When the application is not a windowed application, display the window frame of the application in a full-screen mode as a default process of the Android OS does.

After the window command adding process is completed, the window frame of an application executed under the multi-window mode is movable, and the size and sequence of the window frame are adjustable. The method in accordance with the present invention further has a window moving process having the following steps.

Step S91: Accept a signal indicating that the title bar 32 of a window frame with an application running thereon has been selected for a specified period of time.

Step S92: Update a position of the window frame after the window frame is dragged and dropped to a new position.

Step S93: Determine if a windowed flag of the selected application is set. When the determination result is positive, perform step S94 and step S95, otherwise perform step S96 and step S95.

Step S94: Modify the position of the selected window frame to the new position.

Step S95: Call a system window drawing software to redraw the selected window frame according to the new position.

Step S96: Perform a default window drawing process of the Android OS on the selected application.

Figure 10:
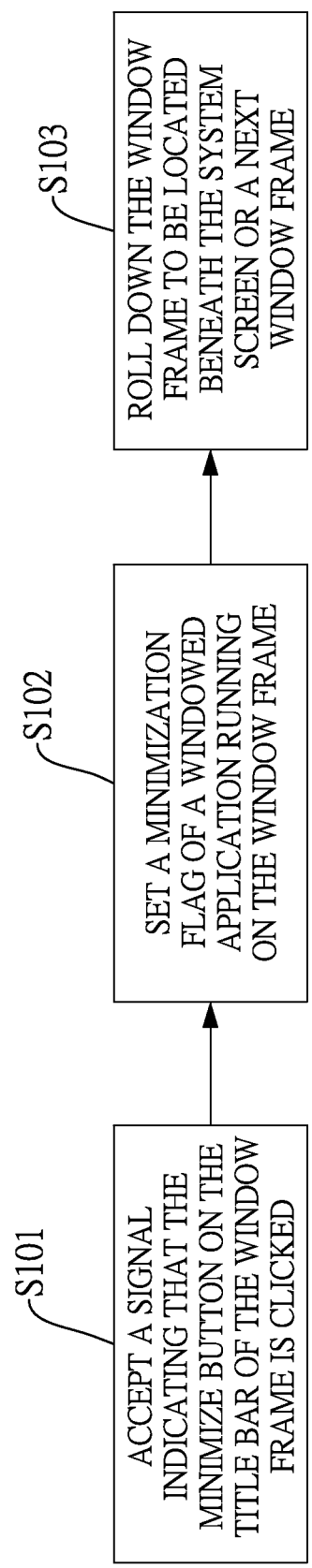
FIG. 10 is a flow diagram of a window minimizing process performed on the mobile OS in accordance with the present invention.

The minimize button 33 on the title bar 32 can be clicked to start a window minimizing process for a window frame to be resized after the sequence of the window frame is changed. With reference to FIGS. 3 and 10, the window minimizing process has the following steps.

Step S101: Accept a signal indicating that the minimize button 33 on the title bar 32 of the window frame is clicked.

Step S102: Set a minimization flag of a windowed application running on the window frame.

Step S103: Roll down the window frame to be located beneath the system screen 10 or a next window frame.

Figure 11:
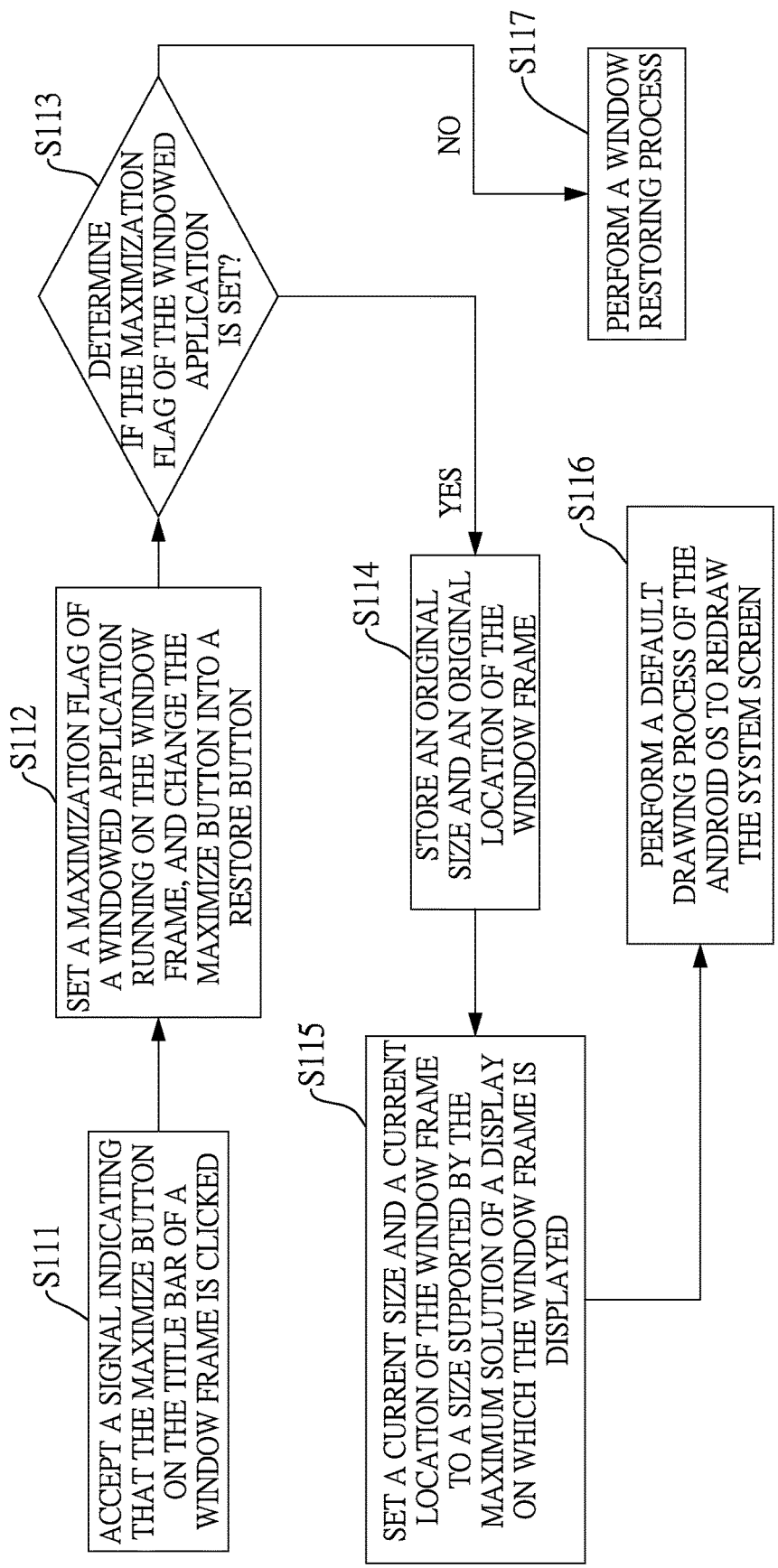
FIG. 11 is a flow diagram of a window maximizing process performed on the mobile OS in accordance with the present invention.

In collaboration with the foregoing window minimizing process, a window maximizing process is provided. The maximize button 34 on the title bar 32 can be clicked to start the window maximizing process so as to maximize a minimized window frame. With reference to FIGS. 3 and 11, the window maximizing process has the following steps.

Step S111: Accept a signal indicating that the maximize button 34 on the title bar 32 of a window frame is clicked.

Step S112: Set a maximization flag of a windowed application running on the window frame, and change an icon of the maximize button 34 into that of a restore button.

Step S113: Determine if the maximization flag of the windowed application is set. When the determination result is positive, perform steps S114, S115, S116, otherwise, perform step S117. As the mobile OS is a multi-tasking OS, the mobile OS needs to check if the maximization flag has been changed by any other simultaneously running process.

Step S114: Store an original size and an original location of the window frame.

Step S115: Set a current size and a current location of the window frame to a size supported by the maximum resolution of a display on which the window frame is displayed.

Step S116: Perform a default drawing process of the Android OS to redraw the system screen 10.

Step S117: Perform a window restoring process.

Figure 12:
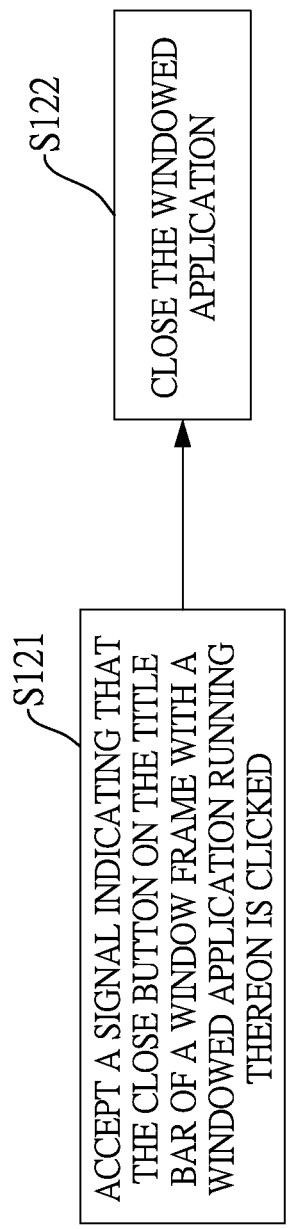
FIG. 12 is a flow diagram of a window closing process performed on the mobile OS in accordance with the present invention.

Moreover, if any launched windowed application needs to be closed during users' operation, a window closing process is provided. The close button 35 can be clicked to start the window closing process. With reference to FIGS. 3 and 12, the window closing process has the following steps.

Step S121: Accept a signal indicating that the close button 35 on the title bar 32 of a window frame with a windowed application running thereon is clicked.

Step S122: Close the windowed application.

Figure 13:
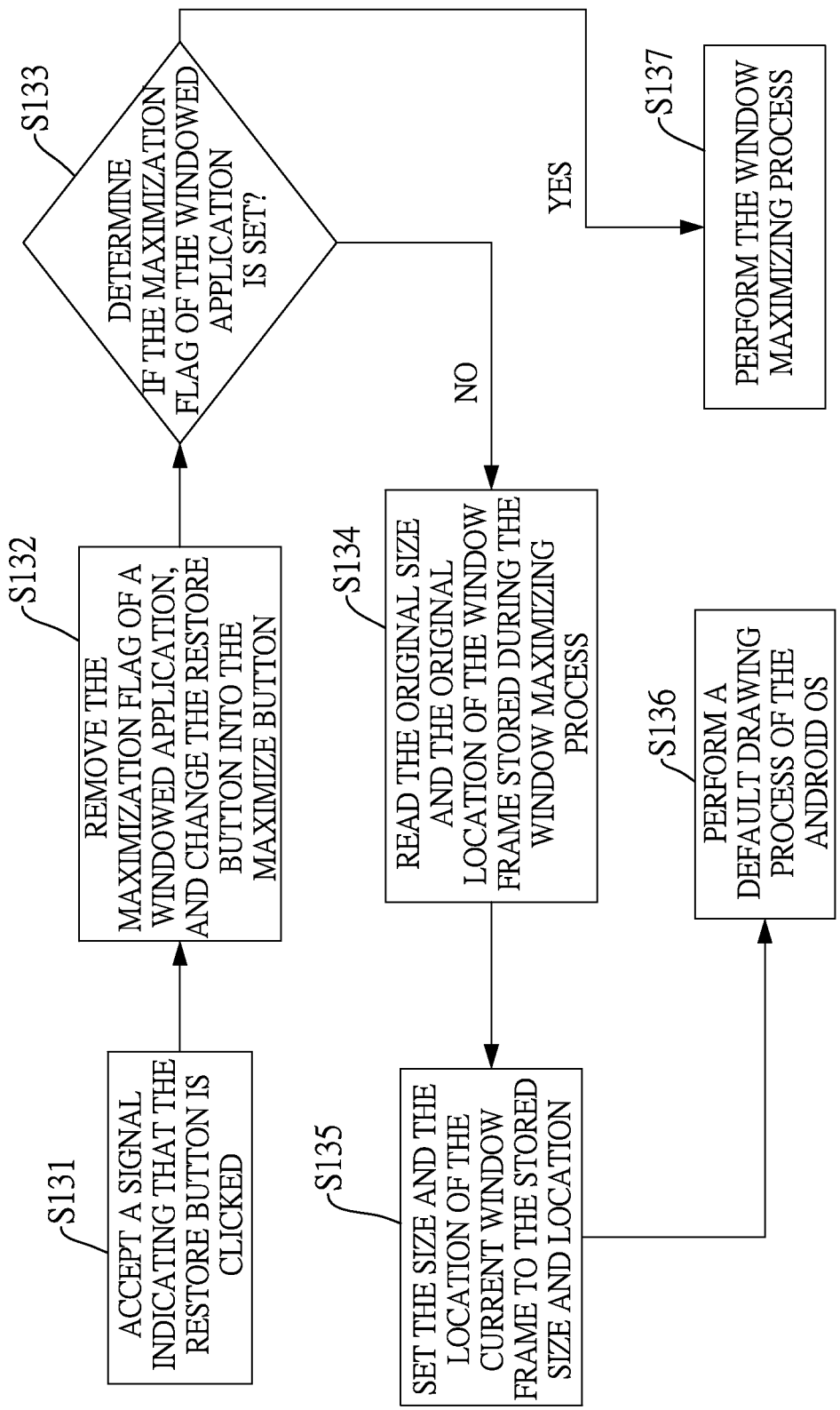
FIG. 13 is a flow diagram of a window restoring process performed on the mobile OS in accordance with the present invention.

The window restoring process executed in the window maximizing process is used to restore a maximized window frame to a window frame in size before the window frame is maximized. The restore button can be clicked to start the window restoring process. With reference to FIGS. 3 and 13, the window restoring process has the following steps.

Step S131: Accept a signal indicating that the restore button on the title bar 32 of a window frame is clicked. The restore button and the maximize button 34 can be toggled and displayed on a same position on the title bar 32.

Step S132: Remove the maximization flag of a windowed application running on the window frame, and change the icon of the restore button into that of the maximize button 34.

Step S133: Determine if the maximization flag of the windowed application is set. When the determination result is positive, perform step S137, otherwise, perform steps S134, S135, and S136. Similar to the reason in Step S113, the mobile OS needs to check if the maximization flag has been changed by any other simultaneously running process.

Step S134: Read the original size and the original location of the window frame stored during the window maximizing process.

Step S135: Set the size and the location of the current window frame to the stored size and location.

Step S136: Perform a default drawing process of the Android OS.

Step S137: Perform the window maximizing process.

Figure 14:
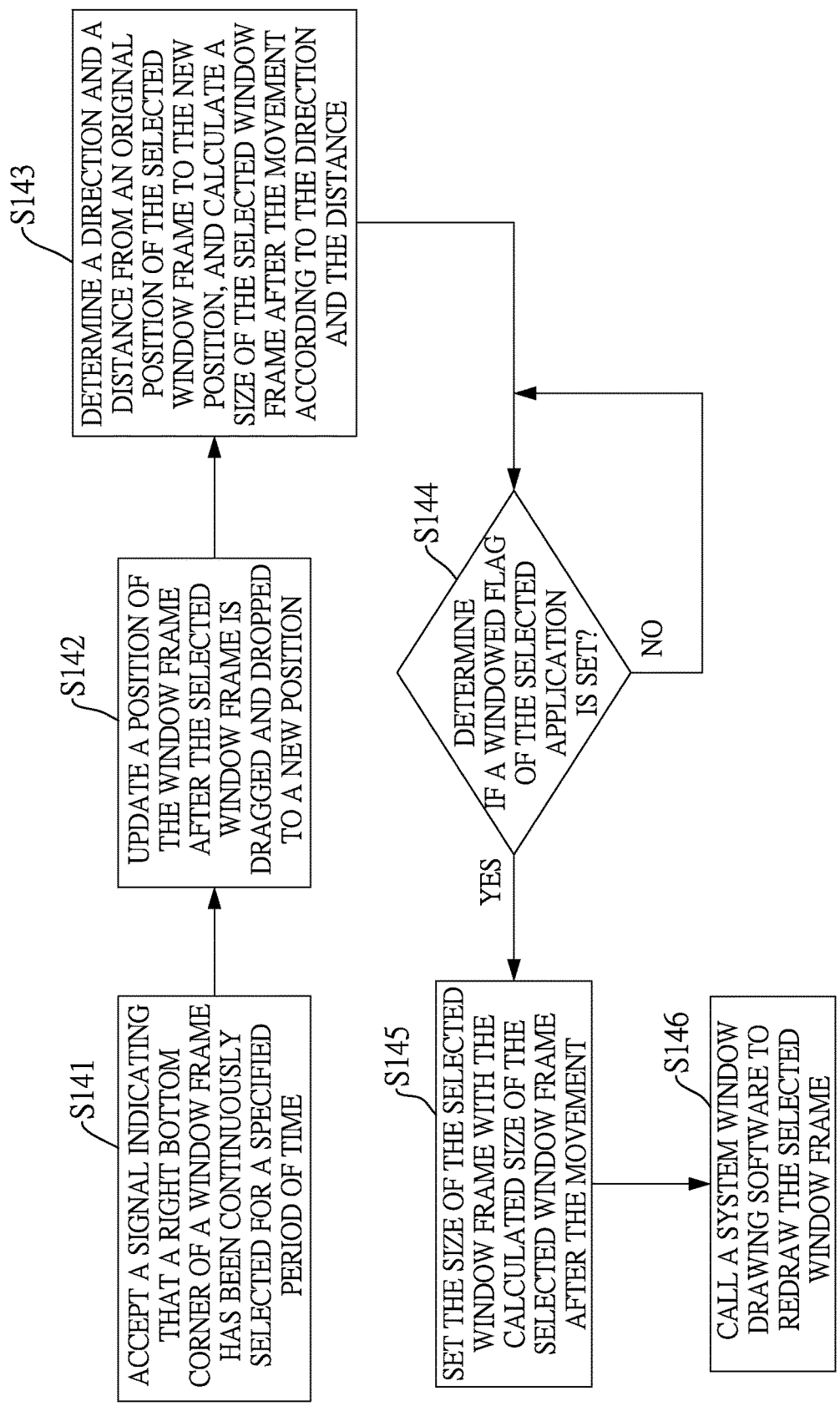
FIG. 14 is a flow diagram of a window size changing process performed on the mobile OS in accordance with the present invention.

Besides the window minimizing process and the window maximizing process, a window size changing process with more flexibility is provided for users to freely adjust the size of a window frame. With reference to FIG. 14, the window size changing process has the following steps.

Step S141: Accept a signal indicating that a right bottom corner of a window frame with an application running thereon has been continuously selected for a specified period of time.

Step S142: Update a position of the window frame after the selected window frame is dragged and dropped to a new position.

Step S143: Determine a direction and a distance from an original position of the selected window frame to the new position, and calculate a size of the selected window frame after the movement according to the direction and the distance.

Step S144: Determine if a windowed flag of the selected application is set. When the determination result is positive, perform steps S145 and S146, and otherwise, resume Step S144.

Step S145: Set the size of the selected window frame with the calculated size of the selected window frame after the movement.

Step S146: Call a system window drawing software to redraw the selected window frame.

Figure 15:
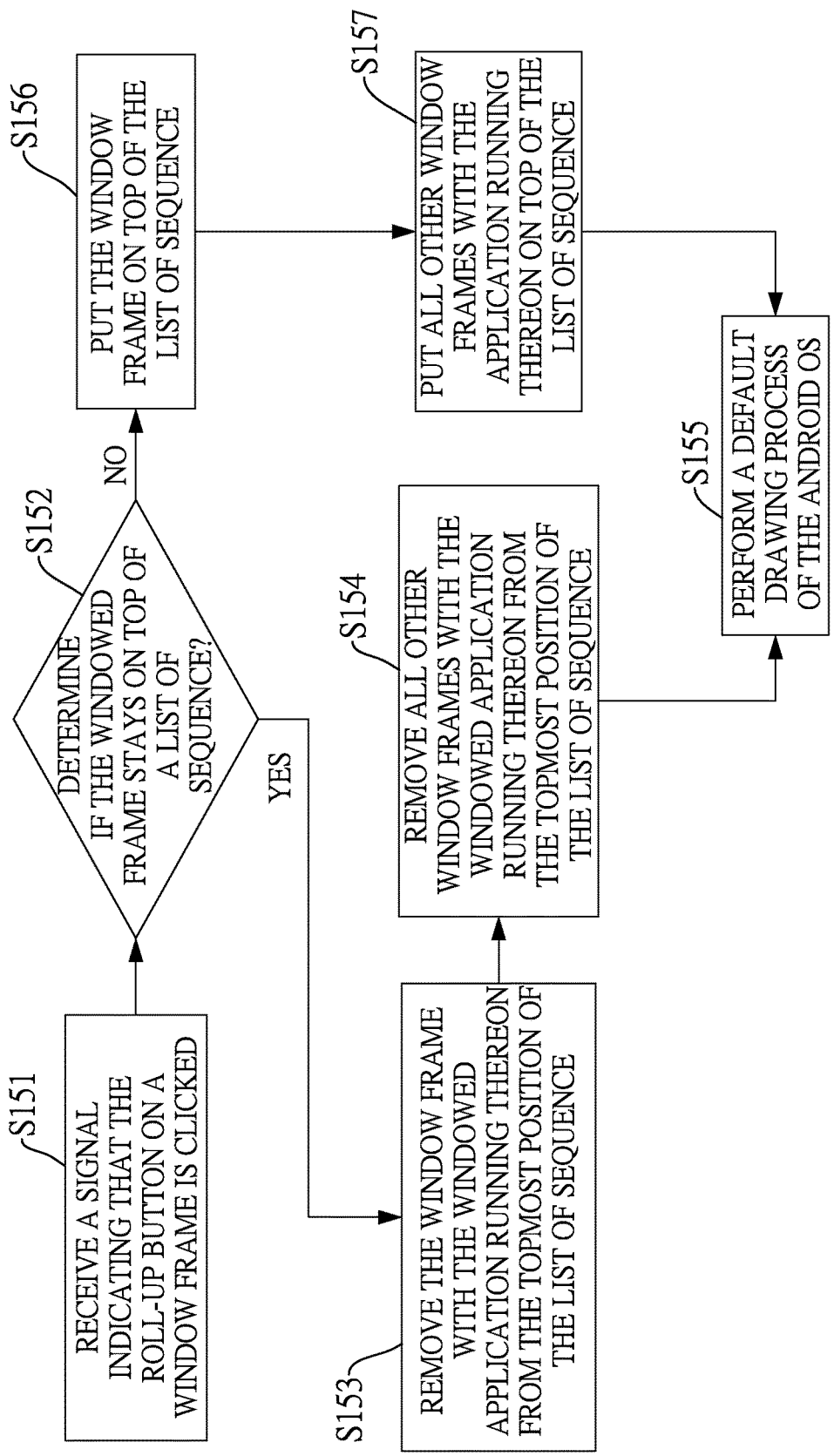
FIG. 15 is a flow diagram of a window-on-top process performed on the mobile OS in accordance with the present invention.

It is noted that a multi-tasking OS is advantageous in simultaneous execution of multiple applications, and a window-based multi-tasking OS should be able to simultaneously execute multiple windowed applications for its optimal operation performance. With reference to FIG. 3, there are multiple windowed applications simultaneously running on the system screen 10. A window-on-top process is provided to keep any selected windowed application staying on top or not to be overlapped or blocked by the window frames of other applications. The roll-up button 36 on the title bar 32 can be clicked to start the window-on-top process. With reference to FIG. 15, the window-on-top process has the following steps.

Step S151: Receive a signal indicating that the roll-up button 36 on a window frame with a windowed application running thereon is clicked.

Step S152: Determine if the windowed frame stays on top of a list of sequence. When the determination result is positive, perform steps S153, S154, and S155, and otherwise, perform steps S157 and S155.

Step S153: Remove the window frame with the windowed application running thereon from the topmost position of the list of sequence.

Step S154: Remove all other window frames with the windowed application running thereon from the topmost position of the list of sequence.

Step S155: Perform a default drawing process of the Android OS.

Step S156: Put the window frame on top of the list of sequence.

Step S157: Put all other window frames with the application running thereon on top of the list of sequence.

Figure 16:
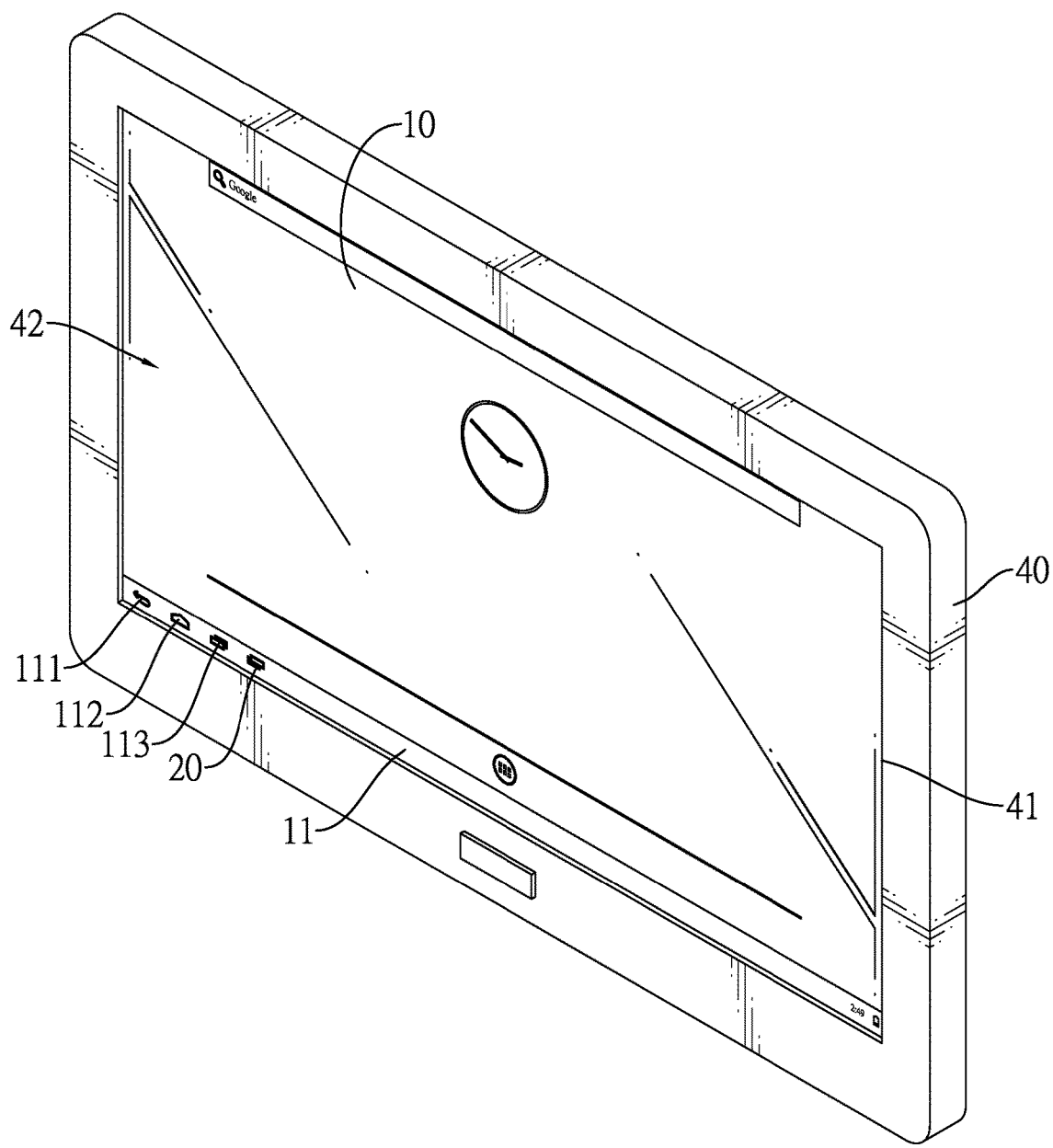
FIG. 16 is a perspective view of a first embodiment of a mobile device in accordance with the present invention.

With reference to FIG. 16, a first embodiment of a mobile device 40 in accordance with the present invention has a storage device, a touch panel, and a processor. The storage device serves to store multiple applications. The touch panel has a touch pad 41 and a display 42. The touch pad 41 serves to receive a signal from users for launching a selected application. The display 42 serves to display a system screen. The processor is managed by a mobile OS, and is electrically connected to the touch pad 41, the display 42, and the storage device. The mobile OS flags the selected application as a windowed application and displays the selected application under a multi-window mode. Besides, the size and the location of the displayed windowed application can be adjusted. As to how to flag an application and display the application in the multi-window mode, the detailed implementation can be referred to the description associated with FIGS. 1 to 15.

The mobile device 40 may be a smart phone, a tablet personal computer (PC), a notebook computer, a desktop computer, a television, or the like. The mobile device 40 can be operated in a flexible manner. Given the clicking means as an example, a touch panel can be pointed to and clicked on by a finger or a stylus. The mobile device 40 further has a signal input port electrically connected to the processor and a pointing device. When the mobile device 40 is a notebook computer, a desktop computer, or a television, the equipped signal input port can support the operation of the pointing device. In the present embodiment, the starting button 20 is located on the status bar 11, and is a virtual button displayed on a display area of the touch panel.

Figure 17:
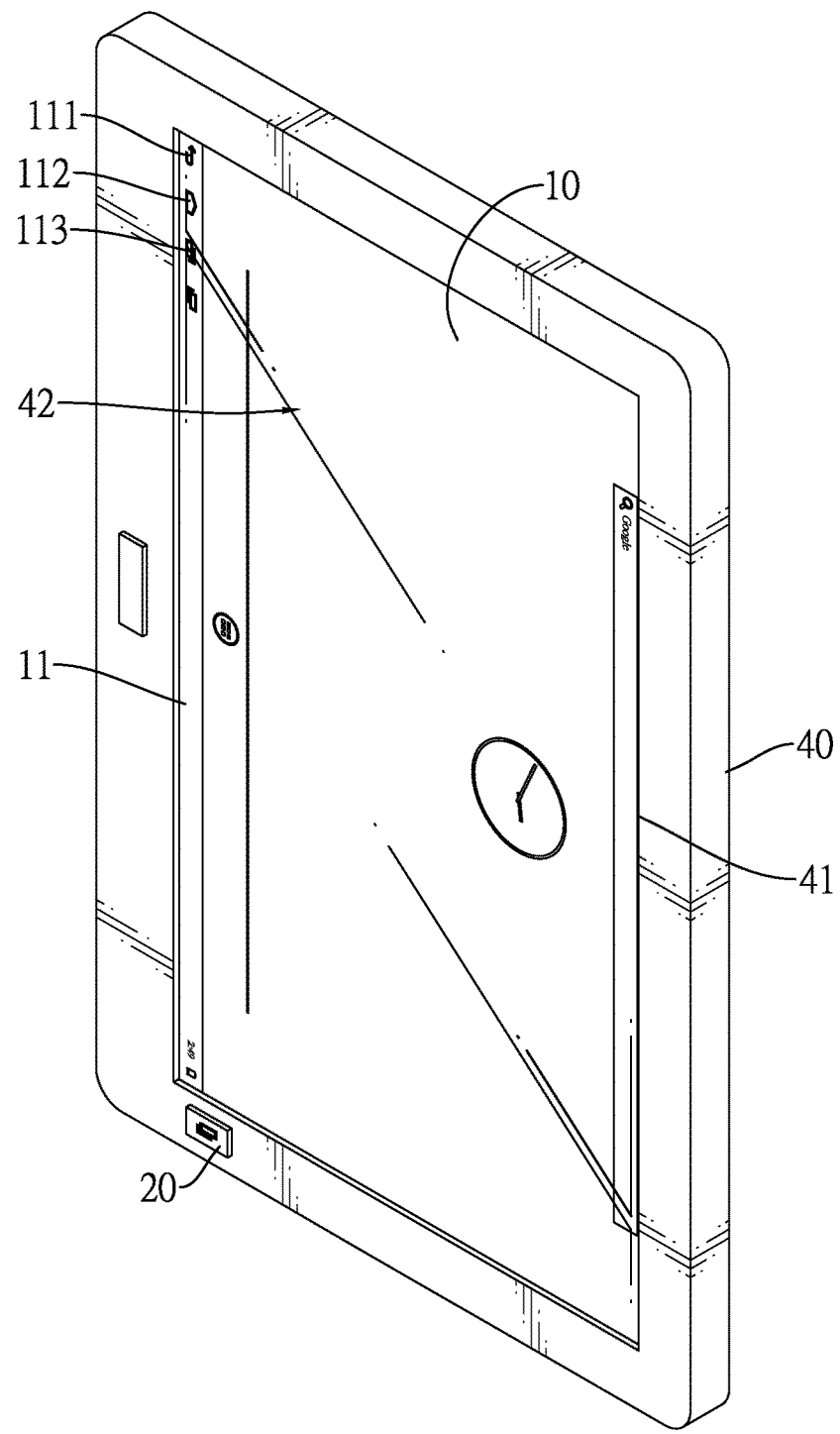
FIG. 17 is a perspective view of a second embodiment of a mobile device in accordance with the present invention.
Figure 18:
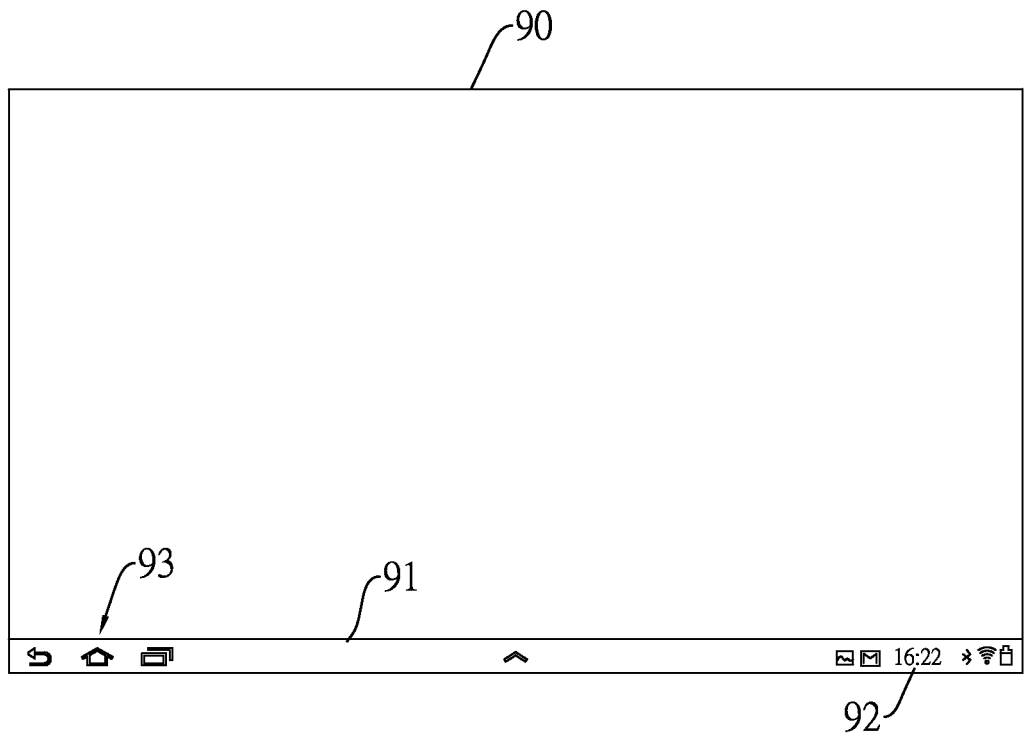
FIG. 18 is a schematic view of a default system screen of a conventional Android OS.
Figure 19:
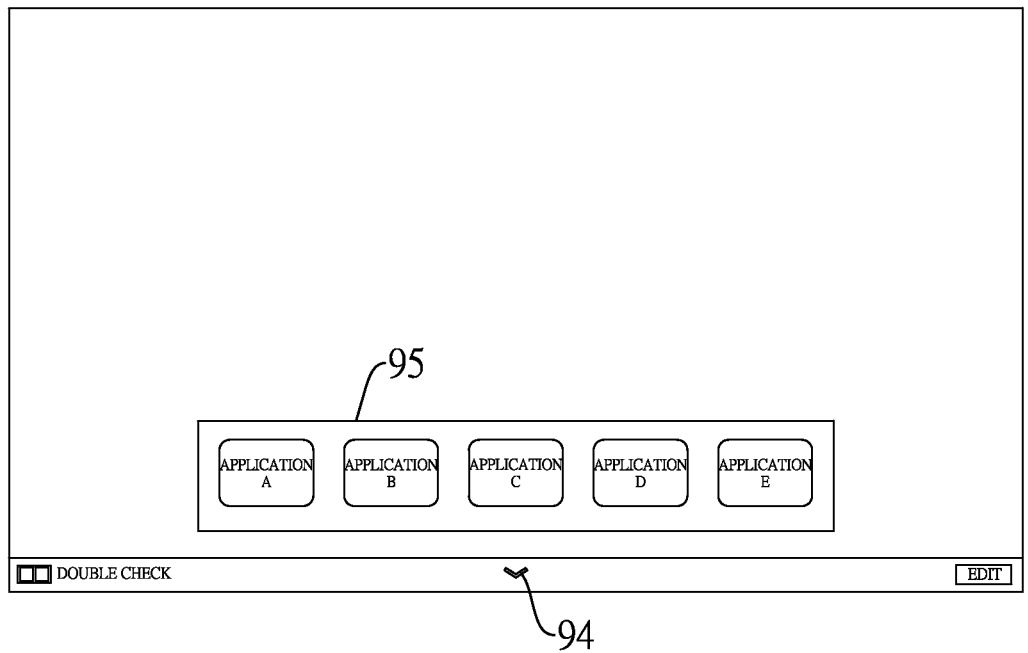
FIG. 19 is a schematic view of the system screen in FIG. 18 with an app menu displayed on the system screen.

With reference to FIG. 17, a second embodiment of a mobile device 40 in accordance with the present invention is substantially the same as the first embodiment except that the starting button 20 is a physical button mounted on a non-display area of the touch panel. The starting button 20 is electrically connected to the processor for users to directly press thereon. Accordingly, all windowed applications in the windowed application menu 12 can be displayed, and the operational efficiency and convenience for the execution under a mobile OS can be enhanced through the method of starting applications installed on a mobile OS under a multi-window mode in the present invention.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method of starting applications installed on a mobile operating system (OS) under a multi-window mode, the method performed by the mobile OS and comprising steps of:
    providing a system screen;
    displaying in a default menu at least two applications for users to select;
    displaying in a windowed application menu at least two windowed applications for users to select;
    receiving an execution command from the default menu or the windowed application menu that initiates execution of a selected application of the at least two applications;
    determining if the selected application is a flagged windowed application, and if the selected application is being selected from the windowed application menu;
    running the selected application under a multi-window mode, if the selected application is a flagged windowed application and if the selected application is being selected from the windowed application menu;
    adding the selected application, selected from the default menu, to a windowed application menu and flagging the selected application as the flagged windowed application, if the selected application is a multi-window enabled application;
    adding the selected application, selected from the default menu, to the windowed application menu, if code of the selected application is directly flagged as a multi-window enabled application;
    running the selected application under a full-screen mode, if the selected application is being selected from the default application menu or if the selected application is not a flagged windowed application; and
    adding the flagged windowed application, after selection, to the windowed application menu including only multi-window enabled applications,
    wherein the default menu and the windowed application menu are distinct and displayed on a system screen,
    wherein the windowed application menu is displayed on the system screen in response to selection of a start button of the system screen,
    wherein the default application menu is displayed on the system screen in response to selection of a recent application listing button of the systems screen, and
    wherein the start button and the recent application listing button are displayed on a status bar of the system screen.

2. The method as claimed in claim 1, wherein the step of running the selected application further has steps of:
    determining if a windowed flag of the selected application is set;
    configuring a size and a location of a window frame with the selected application running thereon and displaying the selected application under the multi-window mode when the windowed flag is set; and
    displaying the selected application under a full-screen mode when the windowed flag is not set.

3. The method as claimed in claim 2, wherein the step of displaying the selected application under the multi-window mode further has steps of:
    providing the window frame on the system screen with the selected application running on the window frame;
    receiving a clicking signal;
    determining if the clicking signal occurs on a position within the window frame having the selected application; and
    if the position within the window frame corresponds to a non-selected application, executing the non-selected application.

4. The method as claimed in claim 2, wherein the step of displaying the selected application under the multi-window mode further has steps of:
    displaying sequentially as overlapping layers at least two window frames respectively having the at least two windowed applications on the system screen;
    sequentially picking one of the at least two window frames;
    determining if the picked window frame is hidden;
    drawing the window frame on the system screen when the picked window frame is not hidden, and if the picked window is hidden, determining if any of the at least two window frames has not been drawn yet; and
    returning to the step of sequentially picking one of the at least two window frames if any of the at least two window frames has not been drawn yet.

5. The method as claimed in claim 3, wherein the step of providing the window frame on the system screen with the selected application running on the window frame further has steps of:
    providing a title bar on the window frame of the selected application with multiple command icons on the title bar, wherein the command icons include a minimize button, a maximize button, a close button, and a roll-up button.

6. The method as claimed in claim 5, further comprising a window moving process, the window moving process having steps of:
  accepting a signal indicating that the title bar of one of the at least two window frames with a selected application running thereon has been continuously selected for a period of time and the selected window frame is being dragged;
  generating a new position of the selected window frame after the selected window frame is dragged and dropped;
  determining if the windowed flag of the selected application is set; and
  modifying a current position of the selected window frame to the new position and redrawing the selected window frame according to the current position when the windowed flag of the selected application is set.

7. The method as claimed in claim 5, further comprising a window minimizing process launched by clicking the minimize button of the selected application, and the window minimizing process having steps of:
  accepting a signal indicating that the minimizing button is clicked;
  setting a minimization flag of the selected application running on the window frame; and
  rolling down the window frame with the minimization flag to be located beneath the system screen.

8. The method as claimed in claim 5, further comprising a window maximizing process launched by clicking the maximize button, the window maximizing process having steps of:
  accepting a signal indicating that the maximize button is clicked;
  setting a maximization flag of the selected application running on the window frame, and changing the maximize button to a restore button;
  determining if the maximization flag of the selected application is set; and
  when the maximization flag is set, storing an original size and an original location of the window frame, setting a current size and a current location of the window frame to a size supported by a maximum resolution of a display on which the window frame is displayed, and redrawing the system screen.

9. The method as claimed in claim 5, further comprising a window closing process launched by clicking the close button, the window closing process having steps of:
  accepting a signal indicating that the close button is clicked; and
  closing the selected application.

10. The method as claimed in claim 5, further comprising a window size changing process, the window size changing process having steps of:
  accepting a signal indicating that a window frame with an application running thereon has been continuously selected for a period of time;
  updating a position of the window frame after the selected window frame is dragged and dropped to a new position;
  determining a direction and a distance from an original position of the selected window frame to the new position, and calculating a size of the window frame after the dragging and dropping according to the direction and the distance;
  determining if a windowed flag of the application, identifying the application as a flagged windowed application, is set; and
  setting the size of the window frame with the calculated size of the window frame after the dragging and dropping, and redrawing the window frame when the windowed flag of the application is set.

11. The method as claimed in claim 8, further comprising a window restoring process launched by clicking the restore button, the window restoring process having steps of:
  accepting a signal indicating that the restore button is clicked;
  toggling the restore button to display the maximize button and removing the maximization flag of the windowed application running on the window frame selected in the window maximizing process;
  determining if the maximization flag of the selected windowed application is set; and
  setting the size and the location of the window frame with the stored original size and the stored original location of the window frame and redrawing the window frame when the maximization flag of the selected windowed application is set.

12. The method as claimed in claim 8, further comprising a window-on-top process launched by clicking the roll-up button, the window-on-top process having steps of:
  accepting a signal indicating that the roll-up button is clicked;
  determining if the windowed frame with the clicked roll-up button and the selected application running thereon stays on top of a list of sequence; and
  putting all the window frames with the application running thereon on top of the list of sequence and performing a default drawing process of the mobile OS if the window frames with the application running thereon are not on top of the list of sequence.

13. A mobile device, comprising:
  a storage device serving to store multiple applications;
  a touch panel having:
    a touch pad serving to receive a signal for launching a selected one of the applications; and
    a display serving to display a system screen; and
  a processor electrically connected to the touch pad, the display and the storage device, managed by a mobile OS, the processor receiving the signal from the touch panel for launching the selected application, displaying in a default application menu at least two applications for users to select, displaying in a windowed application menu at least two windowed applications for users to select,
  flagging the selected application, selected from the default application menu, as a windowed application if the selected application is a multi-window enabled application,
  if the selected application is a multi-window enabled application, the processor adds the selected application to a windowed application list stored on the storage device;
  if the selected application includes code identifying the selected application as a multi-window enabled application, the processor adds the selected application to the windowed application menu;
  displaying the selected application under a full-screen mode upon receiving the signal for launching the selected application from the default application menu, and
  displaying the selected application under a multi-window mode upon receiving the signal for launching the selected application from the windowed application menu, wherein a size and a location of the displayed windowed application are adjustable, and wherein, after selection, the processor adds the flagged windowed application to the windowed application menu, the windowed application menu including only multi-window enabled applications, wherein the default menu and the windowed application menu are distinct and displayed on a system screen, wherein the windowed application menu is displayed on the system screen in response to selection of a start button of the system screen, wherein the default application menu is displayed on the system screen in response to selection of a recent application listing button of the systems screen, and wherein the start button and the recent application listing button are displayed on a status bar of the system screen.

14. The mobile device as claimed in claim 13, wherein the touch panel receives the signal for launching the selected application and transmits the signal to the processor for the processor to select the application from the multiple applications already installed on the mobile OS.

15. The mobile device as claimed in claim 13, wherein the storage device stores at least one windowed application.

16. The mobile device as claimed in claim 13, further comprising a starting button, wherein the starting button is a physical button mounted on the touch panel, and the starting button is electrically connected to the processor which receives a selection signal and the signal for launching the selected application.

17. The mobile device as claimed in claim 13, further comprising a signal input port electrically connected to the processor and a pointing device, wherein the pointing device receives a selection signal and the signal for launching the selected application.

18. The mobile device as claimed in claim 13, wherein the default application menu includes both multi-windowed enabled applications and single-window applications.

19. The method as claimed in claim 1, wherein the system screen provides no applications to be selected by the users, and wherein the default menu and windowed application menu overlay the system screen.

* * * * *